United States Patent [19]

Sheiman

[11] Patent Number: 4,744,633
[45] Date of Patent: May 17, 1988

[54] STEREOSCOPIC VIEWING SYSTEM AND GLASSES

[76] Inventor: David M. Sheiman, 1401 Alvarado Terr., Los Angeles, Calif. 90006

[21] Appl. No.: 830,459

[22] Filed: Feb. 18, 1986

[51] Int. Cl.$^4$ .................. G02B 27/26; G02B 7/18; G02C 7/12; G02C 7/16
[52] U.S. Cl. .................. 350/132; 350/139; 350/143; 351/41; 351/49; 351/201
[58] Field of Search .............. 350/132, 139, 143, 146, 350/130, 144, 276 R; 351/41, 49, 201, 202; 358/91

[56] References Cited

U.S. PATENT DOCUMENTS

| | | | |
|---|---|---|---|
| 2,614,255 | 10/1952 | Ellis | 351/49 |
| 2,817,332 | 12/1957 | Shlechter | 351/202 |
| 4,511,225 | 4/1985 | Lipson | 351/49 |
| 4,559,556 | 12/1985 | Wilkins | 350/132 |
| 4,582,393 | 4/1986 | Sheiman | 350/132 |
| 4,588,259 | 5/1986 | Sheiman | 350/132 |
| 4,595,262 | 6/1986 | Ogle | 351/49 |
| 4,597,634 | 7/1986 | Steenblik | 350/131 |

FOREIGN PATENT DOCUMENTS 184118  10/1983  Japan .................. 350/132

Primary Examiner—Jon W. Henry
Attorney, Agent, or Firm—Plante, Strauss & Vanderburgh

[57] ABSTRACT

An optical system to permit viewing of adjacent stereoscopic images in which the observers each wear a pair of eyeglasses to view the display. Polarizing light filters are positioned in front of each of the stereoscopic images and these filters have different angles of polarization to encode each image. Each eyepiece includes a polarized filter which decodes the image for its respective eye, and a rotatably adjustable prism which deviates the line of sight a sufficient degree that both stereoscopic images are fused in the fovea of the eye. The rotatably adjustable prism can be a solid prism or a Fresnel prism and Fresnel prisms are preferred. The rotation of the prism permits the observer to adjust the refractory angle of the image regardless of the observer's distance to the image source, and thus permits the observer to move about the displayed images and permits a plurality of observers to view the display.

22 Claims, 10 Drawing Sheets

STEREOSCOPIC VIEWING SYSTEM AND GLASSES

TECHNICAL FIELD OF THE INVENTION

This invention relates to a stereoscopic viewing system, and in particular, to a system which is adaptable for electronic transmission of images and/or projection viewing by a plurality of observers.

BACKGROUND OF THE INVENTION

Optical stereoscopic viewing systems have been known since practically the advent of photography. The major obstacle encountered in prior systems which has, heretofore, limited their use, has been the inability to confine the sight of each of the observer's eyes to a respective one of a pair of right and left stereoscopic images, while permitting these images to fuse into a single stereoscopic image to the observer.

Attempts have been made to superimpose stereoscopic images onto a single polarizing screen. In this application, the pair of right and left images are polarized and projected onto a special screen that does not lose the polarization of the images which are superimposed on each other. When viewed through polarizing glasses, the illusion of a stereoscopic image is achieved. This system requires the use of elaborate photographic equipment, particularly a specialized polarizing projection system and screen and is not adaptable for electronic transmission, e.g., cannot be transmitted and viewed with television sets.

Some attempts have been made to achieve stereoscopic images with television transmission by use of color filters to view color encoded right and left stereoscopic images which are broadcast and viewed with conventional television equipment. The difficulty with this system is that it compromises both the stereoscopic illusion and the color quality of the images. Furthermore, color discriminate stereoscopic transmission requires the use of encoded filter lenses which if not available or not used results in off color, hazed-edge images. Preferably, a successful system should permit the viewer to see two-dimensional images without compromise of the image quality when the eyepieces, i.e., lenses or filters, are not worn.

The employment of solid prisms and polarizing filters housed in an eyeglass format is disclosed by Karl Schenk in German Patent No. 1,161,128. Other inventors disclosed various uses of solid prisms to refract one or both images at the observer's eye or eyes to achieve stereoscopy. None of the inventions however, accommodate the need, in one pair of glasses, to vary diopter power of the refraction means depending upon the varying distance from the observer to the image source.

BRIEF STATEMENT OF THE INVENTION

This invention comprises a stereoscopic viewing system in which right and left stereoscopic images are displayed in lateral or vertical side-by-side array. Each image is encoded, either polarized or monochromatic lights and the observers wear eyepieces which comprise, at least, a monocle having a stationary, decoding (either a polarized or colored) filter and a rotatably adjustable prism with a diopter angle that is sufficient to diverge the line of sight so that its respective stereoscopic image is received on the fovea of the observer's eyes and fused by the observer into a single stereoscopic illusion. Because the stereoscopic images are displayed side-by-side, they can be transmitted in this fashion using conventional television transmission systems and can be viewed with an ordinary television set or a television projection screen. Since the observer's eyes are blocked optically from the wrong image by the encoding and decoding filters, there is no necessity to position each observer at a very critical, close spacing to the images. Instead, the images can even be projected on the wall of a large room and viewed from any location within the room. This permits an observer to move about the room and several or more observers to view a single stereoscopic image display. An additional advantage is that this system can be used with existing stereoscopic films and photographs since the encoding and decoding filters are between the image display and the observer. The greater the distance the observer is positioned from the image source, the smaller the image is perceived, and the less diopter power is required to overlap the images. The rotatably adjustable prisma described in this application permit the observer to vary the displacement of the image of images to effect comfortable stereoscopy.

BRIEF DESCRIPTION OF THE DRAWINGS

This invention will be described with referenced to the FIGURES of which.

DESCRIPTION OF PREFERRED EMBODIMENTS

Figure 1:
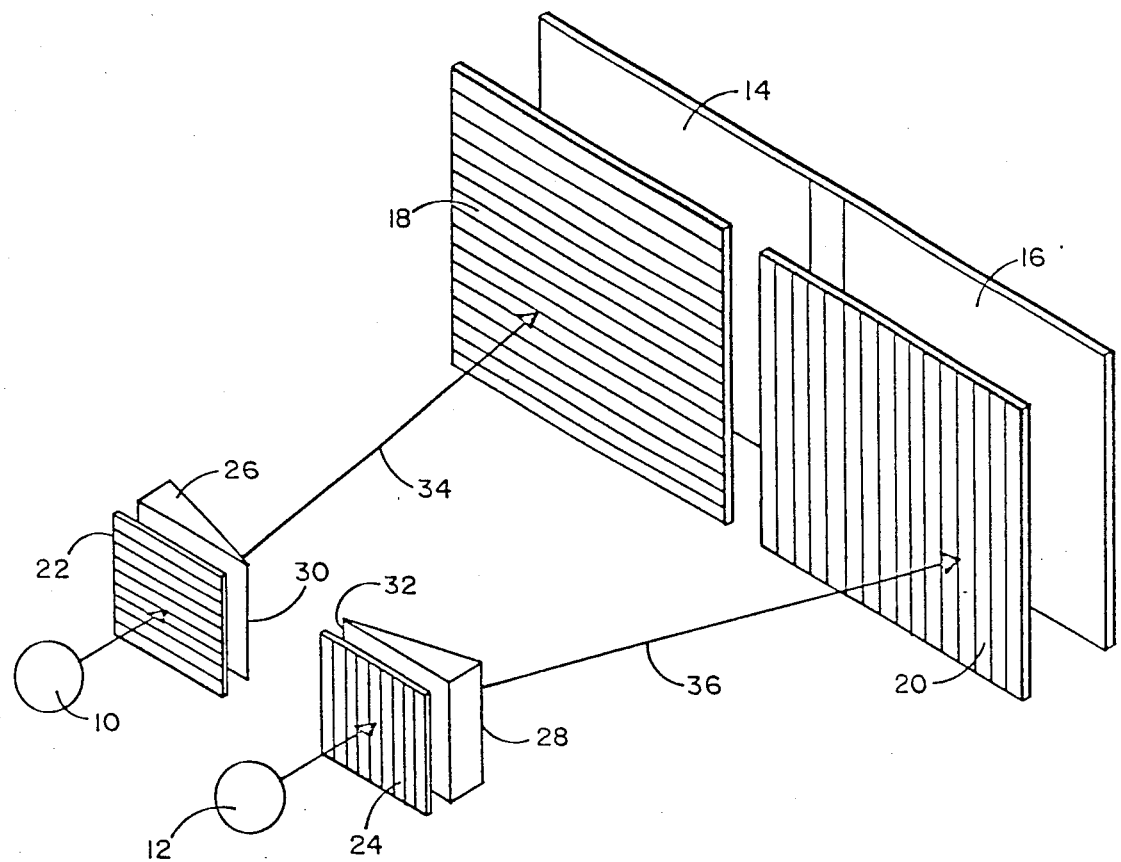
FIG. 1 illustrates a stereoscopic system wherein polarized, prismatic lens glasses are employed for viewing a lateral side-by-side image array.

Referring now to FIG. 1, a stereoscopic system is illustrated as applied to the eyes 10 and 12 of an observer. A pair of stereoscopic left and right images 14 and 16 are positioned in a side-by-side array for viewing by the observer. Each of the images is encoded, preferably polarized by a respective polarizing filter or screen such as filters 18 and 20 which are positioned in front of their respective stereoscopic image. A corresponding polarizing filter is positioned in proximity to the observer's eyes 10 and 12 and these are shown as filters 22 and 24. For the purposes of illustration, the filters are depicted by parallel horizontal or vertical lines. This is only illustrative to represent that these filters are active in polarizing the light in horizontal or vertical planes. The polarizing filters are oriented at right angles in the illustrated manner. Also located in proximity to the observer's eyes 10 and 12 is at least one prism. Preferably two, prisms 26 and 28 are used and are positioned with their apex edges 30 and 32 pointed inwardly, with the result that the lines of sight 34 and 36 from the observer's eyes 10 and 12 are diverged outwardly in the illustrated manner.

Figure 2:
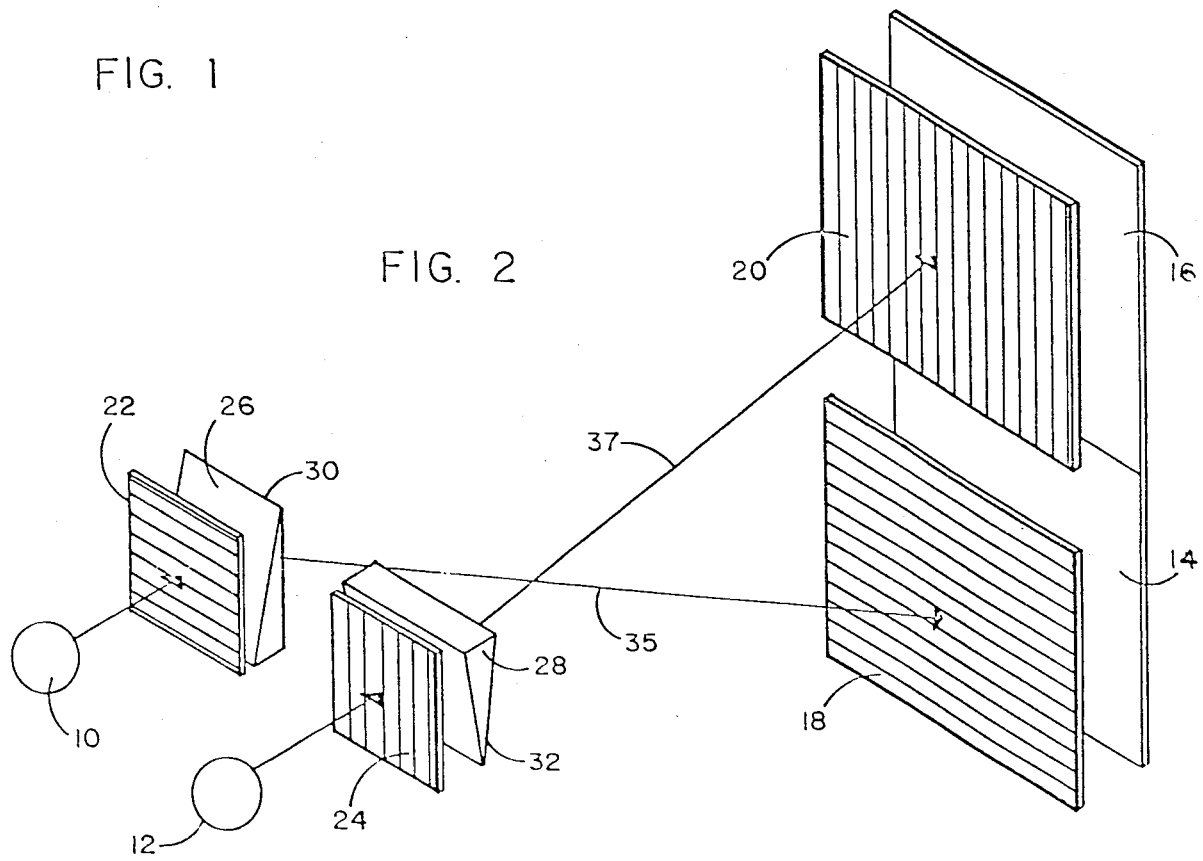
FIG. 2 illustrates a stereoscopic system wherein polarized prismatic lens glasses are employed for viewing vertical side-by-side image array.

Referring now to FIG. 2, an alternate variant of the system is illustrated. As there illustrated, the observer's eyes 10 and 12 are provided with adjacent polarizing filters 22 and 24, substantially as described with reference to FIG. 1. The pair of stereoscopic images 14 and 16, however, are displayed in a vertical, side-by-side array and the corresponding polarizing screens 18 and 20 are similarly positioned in a vertical array. The prisms 26 and 28 in this embodiment, however, are positioned to diverge the lines of sight from eyes 10 and 12 downwardly and upwardly, respectively and, for this purpose, the left prism 26 is positioned with its apex edge 32 pointed downwardly thus deflecting the lines of sight 35 and 37 in the illustrated manner.

Figure 3:
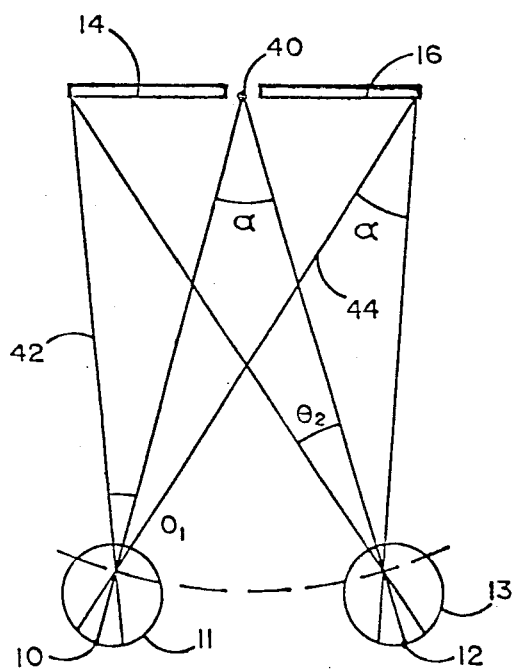
FIG. 3 illustrates the field of vision to an unaided observer.

Referring now to FIG. 3, there is illustrated an attempted display of stereoscopic images which does not achieve a stereoscopic illusion to the observer. This display comprises left and right stereoscopic images 14 and 16 which are positioned in a side-by-side array about a central point 40. The observer's eyes 10 and 12 have a sufficient field of vision to observe both of the stereoscopic images. This is illustrated with regard to the left eye 10 by lines 42 and 44 which sweep out a sufficiently wide arc to encompass both left and right images 14 and 16. Similarly, the right eye 12 has a sufficient field of vision such that both images are seen by this eye. While positioning of right and left polarizing filters in front of the images and also in front of the eyes 10 and 12 in the manner described with reference to FIGS. 1 and 2 will block observation of each of the other images to the respective eyes, a stereoscopic illusion is not achieved because the images are not fused, i.e., are not received at coacting locations on the retina 11 and 13 of each of the eyes 10 and 12. The result is that the viewer must either cross his eyes to fuse the stereoscopic images or view uncoordinated right and left images to attain a stereoscopic illusion.

Figure 4:
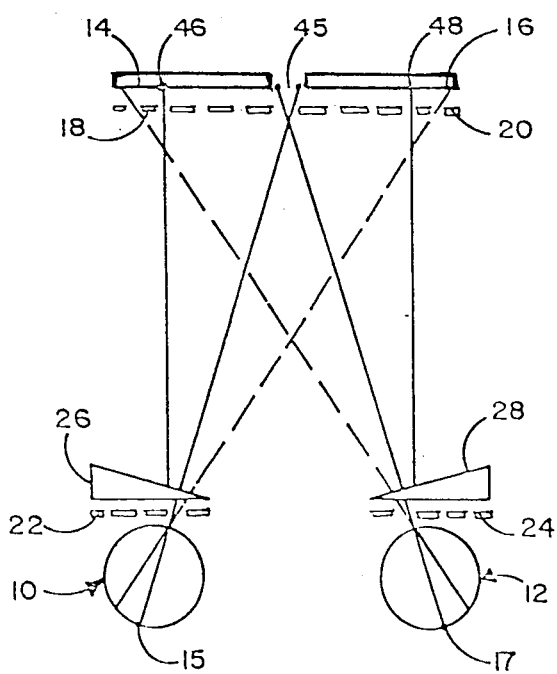
FIG. 4 illustrates the field of vision to an observer using the system of FIG. 1.

Referring now to FIG. 4, the system there illustrated is substantially the same as that of FIG. 3 with the exception that the prisms 26 and 28 have been positioned in front of their respective eyes 10 and 12 and polarizing filters 18 and 20 are positioned in front of the images with cooperative polarizing filters 22 and 24 in front of the observer's eyes. The result is that the center point 45 located between the left and right images 14 and 16 is shifted to the left to point 46 for the left eye 10 and is shifted to the right to point 48 for the right eye 12. This permits the reception of each of the left and right images at the fovea centralis 15 and 17, for each of the eyes, 10 and 12, respectively, and a stereoscopic image is achieved.

As apparent from the preceding diagrams, the stereoscopic illusion can be achieved from a wide variety of angles and various distances from the display of the stereoscopic images. This readily permits observers to move freely about the display without losing the stereoscopic illusion. Preferably, however, some adjustability of the viewing prisms 22 and 24 is provided to permit freedom of movement by the observers in distance from the display of the stereoscopic images. As this distance increases, the required diopter angle of the prisms 20 and 22 decreases, and the binocular eyepiece employed by the observers preferably has adjustable means to permit variation in the positions of the one or more of the viewing prisms to adjust for varied distances from the images.

Figure 5:
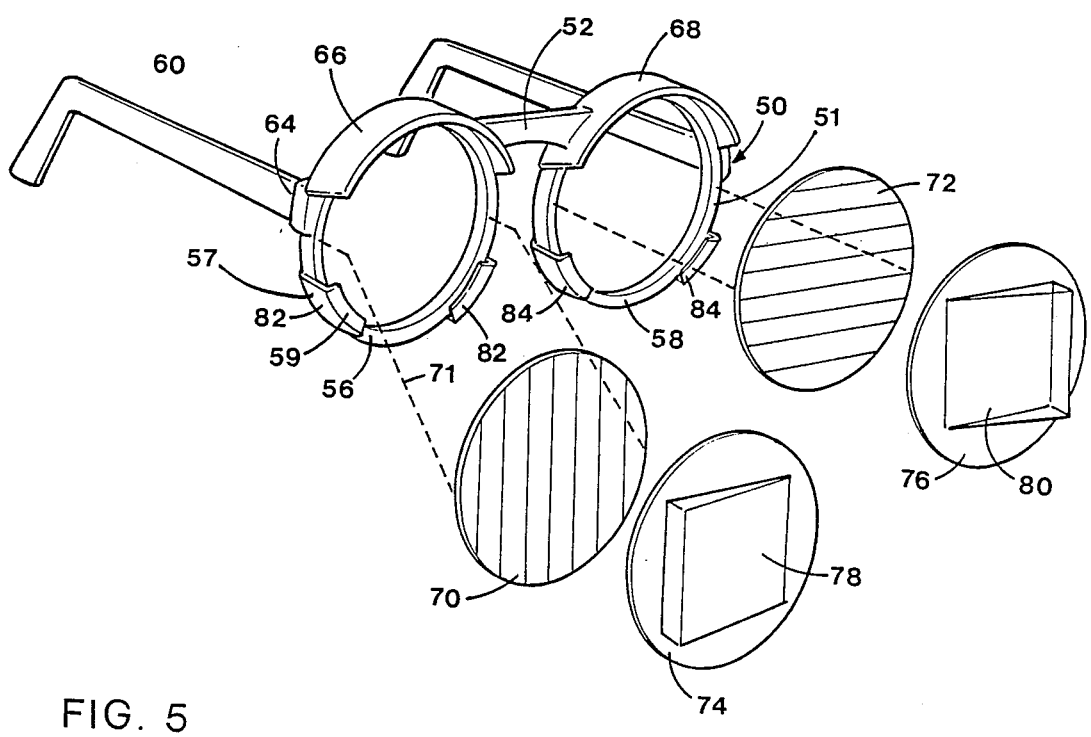
FIG. 5 illustrates glasses for the invention which have rotatably adjustable prisms.

Referring now to FIG. 5, the invention is illustrated with eyeglasses having adjustable means whereby the observer can rotate one or both prisms on the glasses to assist in the fusing of the images, thus accommodating to varied distances from the images. Eyeglasses 50 has a frame 51 with a pair of subframes 56 and 58 dependent from the nose bridge 52 and supporting temples by laterally disposed hinges 64, the latter being conventional in construction and operation. Each subframe 56 and 58, can have visors 66 and 68, respectively, to reduce glare from any overhead lighting. Polarizing filters 70 and 72 are glued, heat staked or solvent welded to subframes 56 and 58 respectively, positioned as illustrated by broken lines 71. These filters are formed of conventional light polarizing crystals such as calcite mineral crystals which are oriented electromagnetically in the film. Alternatively, monochromatic filters such as blue, green or red filters could also be used. Prisms 78 and 80 can be either solid or Fresnel and are fixably attached to circular discs 74 and 76, respectively. The discs 74 and 76 can be an integral part of the prism, as illustrated in FIG. 6.

Arcuate retainer clips 82 are mounted on the subframes 56 and 58. Each is formed of a web 57 and rim 59 to provide circular retention slots in which discs 74 and 76 are rotatably received on the glasses 50, yet remain rotatably adjustable by the observer.

Figure 6:
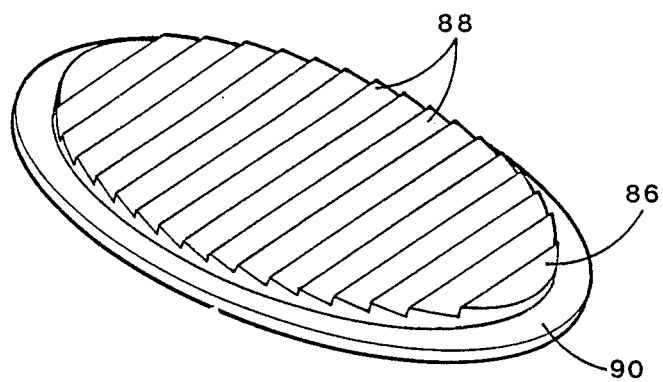
FIG. 6 illustrates a Fresnel prism with an integral rotation ring.

FIG. 6 illustrates Fresnel prism 86 which is comprised of multiple prismatic facets 88 and an integral ring 90 to replace the disc 74 and prism 78 of FIG. 5. The individual prisms are greatly exaggerated for illustrations. In practice, the prisms are formed by a plurality of V-grooves which are closely spaced at a density of 5-500, preferably 10-200, and most preferably 15-50, prisms per inch.

Figure 7:
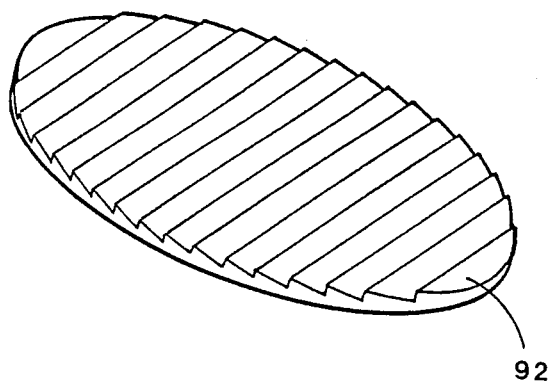
FIG. 7 illustrates a Fresnel prism without an integral rotation ring.

FIG. 7 illustrates Fresnel prism 92 which is of similar construction to that shown in FIG. 6, except that ring 90 is omitted. The prism 92 fits on glasses 50 of FIG. 5 in substitution for disc 74. The prism 92 fits directly into retainer clips 82, and is rotatably adjustable in a similar manner to the adjustability of prisms 78 and 80 shown in FIG. 5.

Figure 8:
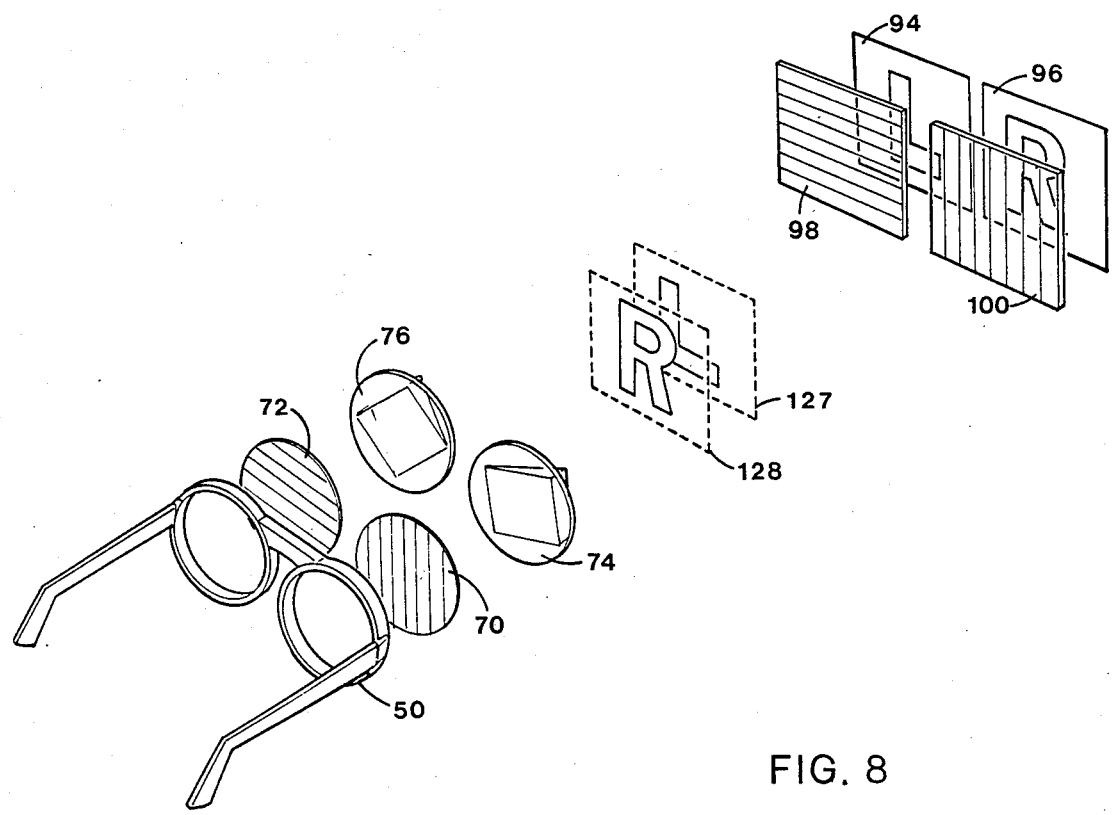
FIG. 8 illustrates the stereoscopic system of the invention with solid rotatable prisms.

Referring now to FIG. 8, the system is illustrated with filters 70 and 72 and rotatable discs with integral prisms, as described in FIG. 5. The rotatable discs and integral prisms are rotated until polarized images 94 and 96 appear superimposed, as illustrated by broken line images 127 and 128. Polarization, as earlier described, is herein achieved by polarizing filters 98 and 100. The rotation of prism discs 74 and 76 allows the observer to adjust the superimposition of the two images so that they comfortably appear on the exact corresponding position of each eye's fovea, thereby achieving stereoscopy.

Figure 9:
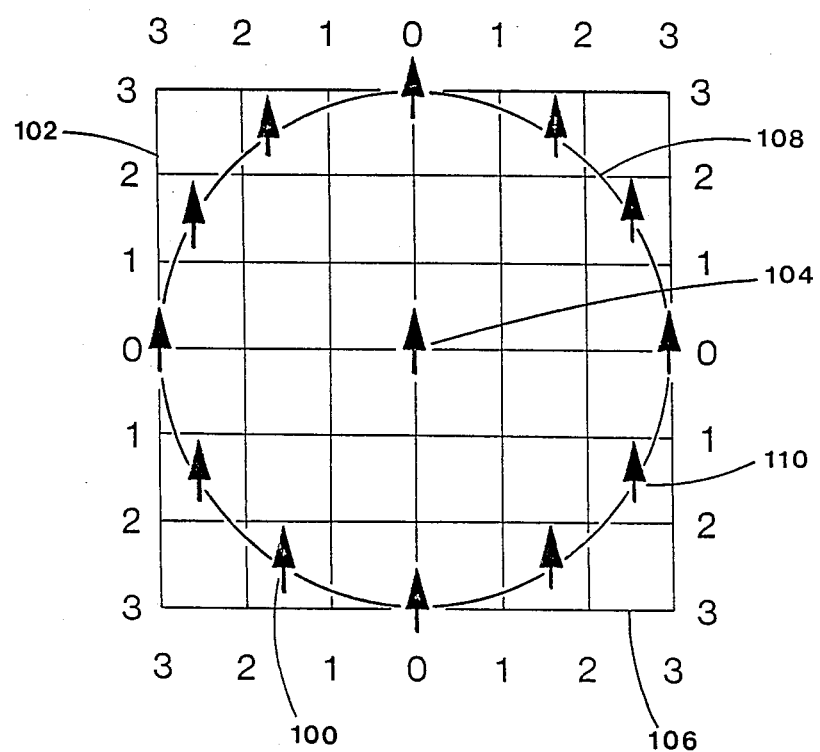
FIG. 9 illustrates the movement of an image around a fixed point on a grid, simulating image rotation, as effected by prism rotation.

By rotating the prisms as described herein, the diopter of the prism can be constant, but the prisms nevertheless will adjust for varied distances from the observer to the images. This permits the prisms to superimpose the images by moving the apparent positions of both the images in two planes, as illustrated by chart 102 in FIG. 9. Image 104 illustrates the position of an image with no prismatic refraction. The numbers 0, 1, 2, and 3 on both horizontal and vertical axes, 106 and 102, respectively, represent diopter power. Ring 108 represents positions whereby the image 104 appears when refracted by a number 3 power diopter prism. As can be seen, the image 104 can be effectively moved in complete orbit about its unrefracted position, as shown by refracted positions 110. The rotation of prism discs 74 and 76 in FIG. 8 can thereby position the images anywhere along the orbit perimeter, as desired by the observer, thus achieving an "effective" diopter power from 0 to 3.

Figure 10:
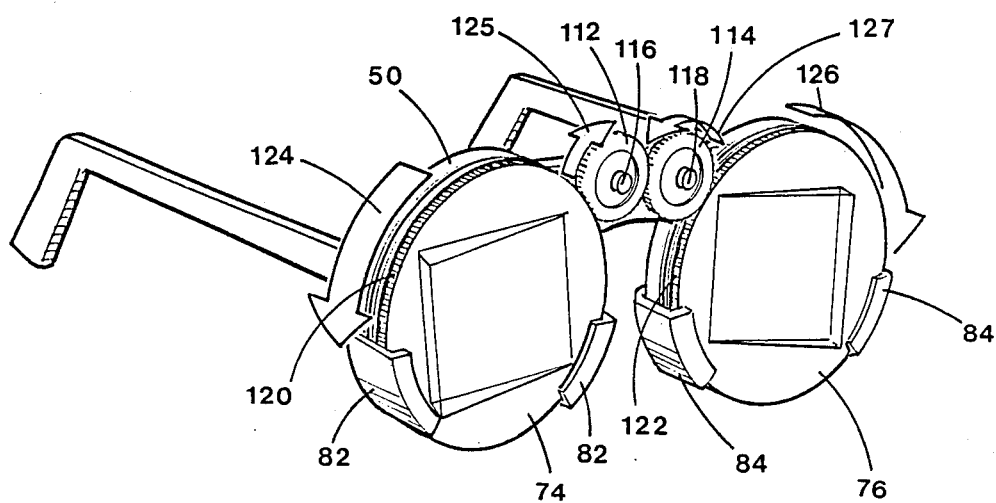
FIG. 10 illustrates the glasses of the invention with intermeshed gears to rotate both prisms simultaneously.

FIG. 10 shows the glasses 50 of FIG. 5 with the addition of interconnected gears 112 and 114 which are mounted on the nosebridge of the frame of glasses 50 with shafts 116 and 118 respectively. Both gears are also interconnected to prism discs 74 and 76, which have mating gear teeth 120 and 122 on their peripheral edges. As the observer rotates either gear to adjust for a varied position to the images, both prisms and both gears rotate simultaneously, as described by arrows 124 through 127. In this embodiment, prism discs rotate in opposite directions. This embodiment is preferred for use with the laterally arrayed images, such as shown in the system of FIG. 1.

Figure 11:
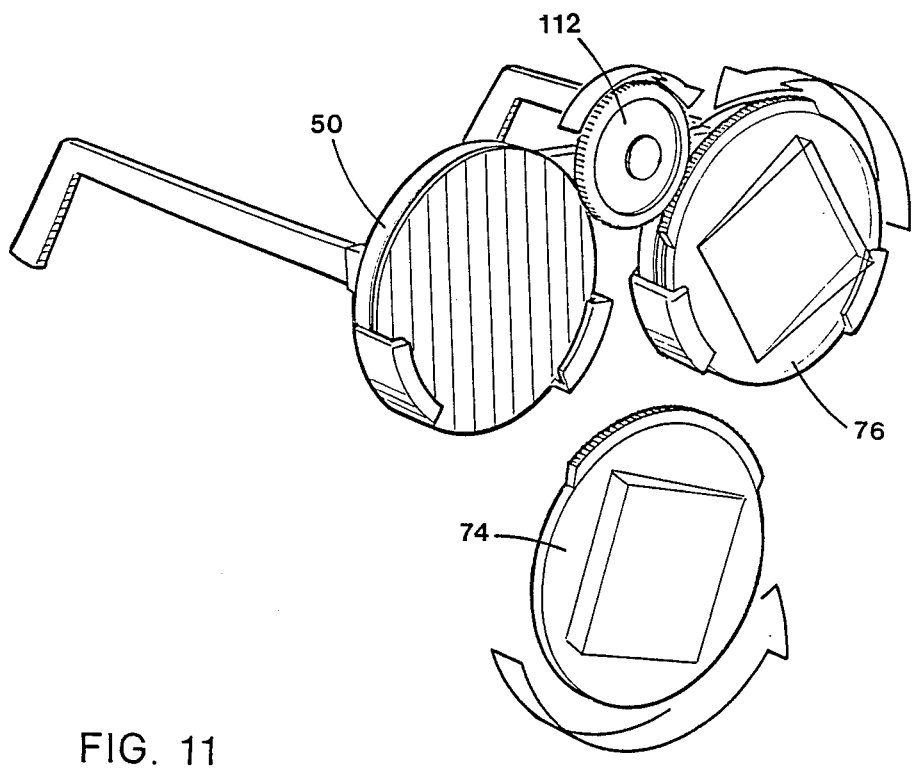
FIG. 11 illustrates the glasses of the invention with 1 intermeshed gear to rotate both of a pair of Fresnel prisms simultaneously.

FIG. 11 illustrates glasses 50 wherein a single gear 112 is interconnected to peripheral gear teeth 120 on prism discs 74 and 76 to facilitate their adjustable rotation in the same clockwise or counterclockwise rotation. This embodiment is preferred for use with the vertically arrayed images, such as shown in the system of FIG. 2.

Figure 12:
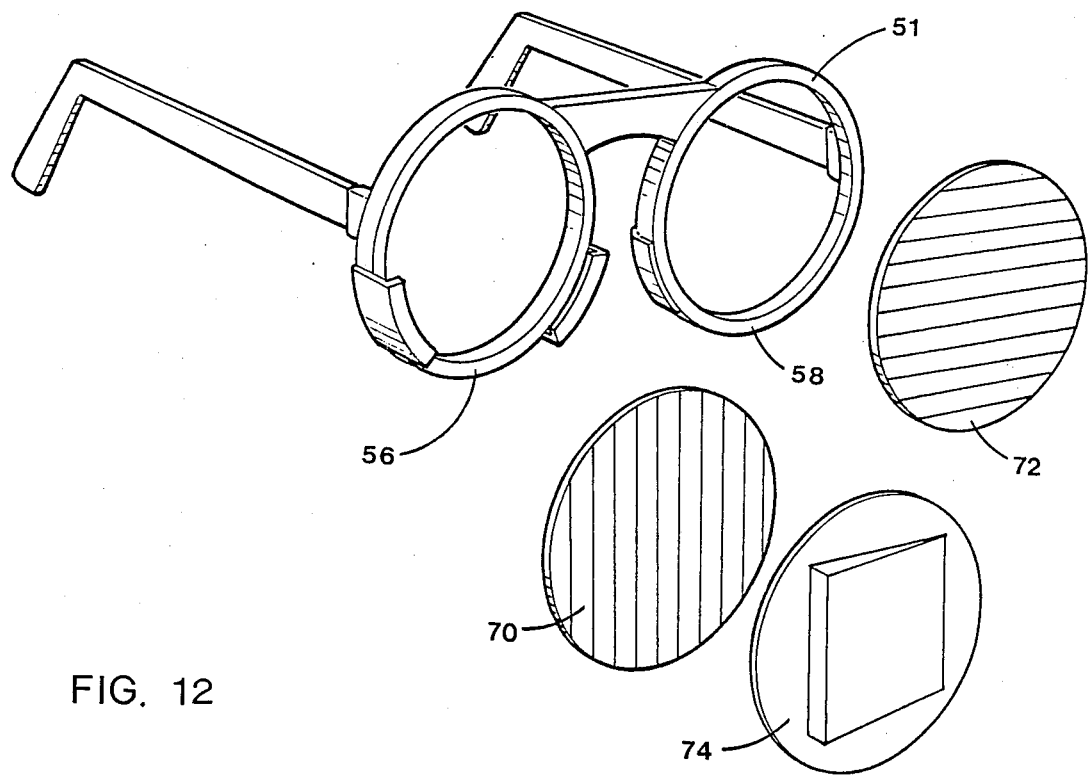
FIG. 12 illustrates an embodiment wherein only one eyepiece has a rotatable Fresnel prism.

FIG. 12 illustrates another embodiment that works extremely well for adjustment of image superimposition when the observer's change of distance from the imaging source is minimal. Glasses 51 are of similar construction as described in FIG. 5, except that only one subframe 56, has provision for rotatably mounting a prism disc 74. Each of the subframes 56 and 58 of the glasses has a polarizing filter, 70 and 72, respectively.

Disc 74 is rotatably mounted on glasses 51 to permit the observer to rotate disc 74 and superimpose the images. This embodiment will move the image up and in, thereby working most effectively for viewing of vertically oriented images as described in FIG. 2.

Figure 13:
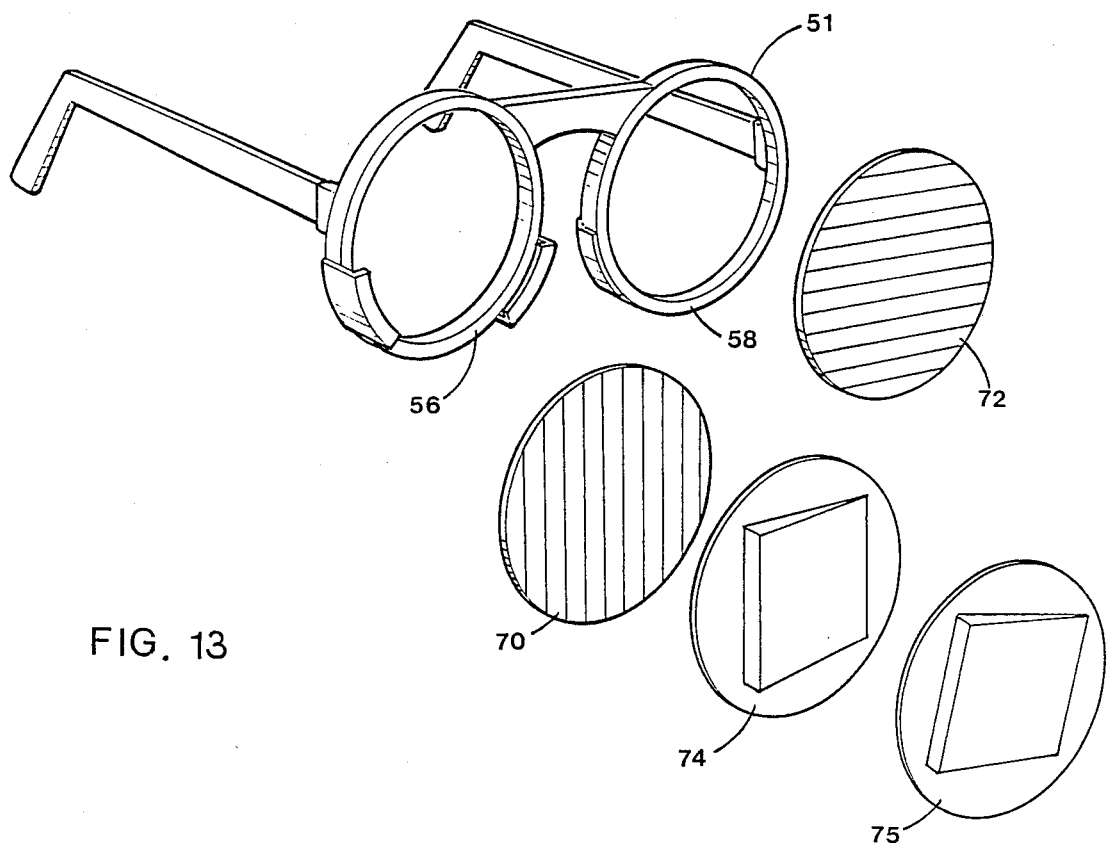
FIG. 13 illustrates an embodiment in which both prisms are located in the same subfarame and rotate independently.

FIG. 13 illustrates another embodiment which has two, independently rotatable prisms mounted on only one subframe, 56. This permits the observer a great freedom of adjustment as the prisms can be rotated to add or subtract diopter powers, or can be independently rotated to displace the image vertically and horizontally, independently in each direction.

This invention eliminates the need for interchangeable varying diopter power prisms. The diopter of each rotatable prism in this invention is most effective, for television size image viewing at around 6 diopters per lens.

It should also be noted that the polarizing lenses could, if desired, be independently rotatable from the prisms. To allow the wearer to utilize the same eyeglasses regardless of the formatting of the polarized image display, such as adopting the classe to different formats in use by different video broadcasters.

It is clearly understandable that another embodiment of this invention could employ glasses with only one subframe having a rotatable prism and with a fixedly mounted prism in the other subframe for simple adjustment of image superimposition.

A slight prismatic distrotion occurs, as typical with any prismatic refraction. As the diopter powers of the prims used in this invention are small, this distortion is minimal. If, however, even this minimum degree of distortion is objectionable, it can be readily corrected with an additional lens element.

The invention has been described with reference to the illustrated and presently preferred embodiments. It is not intended that the invention be unduly limited by this disclosure of presently preferred embodiments. Instead, the invention is intended to be defined by the means, and their obvious equivalents set forth in the following claims:

I claim:

1. A stereoscopic viewing system comprising:
   a. a pair of right and left stereoscopic images of a subject positioned in a side-by-side array;
   b. a pair of light polarizing filters, one each positioned in front of each of said images;
   c. an eyepiece having left and right eyeglass frames worn by an observer and including:
      (1) left and right ocular light polarizing filters mounted on said left and right eyeglass frames so as to be positioned in front of the observer's eyes, each corresponding in polarizing direction to the polarizing filter in front of its respective image;
      (2) at least one thin face prism having an apex edge and one flat planar face and having a faceted face, opposite said flat planar face, which has a plurality of straight, parallel V-grooves to form therebetween a plurality of straight, parallel, triangular prisms and respective prism mounting means on one of said left and right eyeglass frames to position said prism in front of an eye of the observer, and having a diopter angle to diverge the line of sight from said eye sufficiently to merge its respective image on its fovea centralis; and
      (3) adjustment means associated with said prism mounting means permitting the rotatable adjustment of said prism about an axis normal to said flat planar face, whereby said observer can adjust the angular position of said prism to accommodate for varied distances to said images.

2. The stereoscopic viewing system of claim 1 wherein said images are a televideo display.

3. The stereoscopic viewing system of claim 1 wherein the face angle of the triangular prisms is from 1 to about 45 degrees with the plane of the prism.

4. The stereoscopic viewing system of claim 3 wherein the prisms are spaced from 50 to about 500 prisms per inch.

5. The stereoscopic viewing system of claim 4 wherein the prisms are spaced from 10 to about 200 prisms per inch.

6. The stereoscopic viewing system of claim 1 wherein said prism mounting means comprises an arcuate channel contiguous with at least a portion of each of said frames to form an ocular track, and said prism is rotatably received therein.

7. The stereoscopic viewing system of claim 1 including a pair of said prisms, each mounted on a respective one of said left and right frames.

8. The stereoscopic viewing system of claim 7 wherein said mounting means for each of said prisms includes a respective one of said adjustment means, whereby each of said prisms is rotatably adjustable on its respective eyepiece frame.

9. The stereoscopic viewing systems of claim 8 including at least one positioning gear rotatably mounted centrally on said eyepiece, and gear teeth peripherally disposed about each of said prisms and interconnected to the gear teeth of said positioning gear.

10. The stereoscopic viewing system of claim 9 including a pair of interconnected gears, each of which is interconnected with its respective prism.

11. The stereoscopic viewing system of claim 1 including left and right visors coextensive with the top portions of said left and right frames and effective to block incident reflective light from said filters and prism.

12. An eyepiece having left and right eyeglass frames worn by an observer and including:
 a. left and right light polarizing filters mounted on said left and right eyeglass frames so as to be positioned in front of the observer's eyes;
 b. at least one thin face prism having an apex edge and a flat face and a faceted face opposite said flat planar face which has a plurality of straight, parallel V-grooves to form therebetween a plurality of straight, parallel, triangular prisms and respective prism mounting means on one of said left and right eyeglass frames to position said prism in front of an eye of the observer, and having a diopter angle to diverge the line of sight from said eye sufficiently to merge its respective image on its fovea centralis; and
 c. adjustment means associated with said prism mounting means permitting the rotatable adjustment of said prism about an axis normal to said flat planar face, whereby said observer can adjust the angular position of said prism.

13. The stereoscopic viewing eyeglasses of claim 12 wherein the face angle of the triangular prisms is from 1 to about 45 degrees with the plane of the prism.

14. The stereoscopic viewing eyeglasses of claim 13 wherein the prisms are spaced from 50 to about 500 prisms per inch.

15. The stereoscopic viewing eyeglasses of claim 14 wherein the prisms are spaced from 10 to about 200 prisms per inch.

16. The stereoscopic viewing eyeglasses of claim 12 wherein said prism mounting means comprises an arcuate channel contiguous with at least a portion of said frames to form an ocular track, and said prism is slidably received therein.

17. The stereoscopic viewing eyeglasses of claim 12 including a pair of said prisms, each mounted on a respective one of said left and right frames.

18. The stereoscopic viewing eyeglasses of claim 17 wherein said mounting means for each of said prisms includes a respective one of said adjustment means, whereby each of said prisms is rotatably adjustable on its respective eyepiece frame.

19. The stereoscopic viewing eyeglasses of claim 18 including at least one positioning gear rotatably mounted centrally on said eyepiece with gear teeth peripherally disposed about each of said prisms and interconnected to the gear teeth of said positioning gear.

20. The stereoscopic viewing eyeglasses of claim 19 including a pair of interconnected gears, each of which is interconnected with its respective prism.

21. The stereoscopic viewing eyeglasses of claim 12 including left and right visors coextensive with the top portions of said left and right frames and effective to block incident reflective light from said filters and prism.

22. The stereoscopic viewing eyeglasses of claim 12 including first and second prisms, both mounted on a single right or left subframe of said eyeglasses, and independently rotatable thereon.

* * * * *